United States Patent [19]
Kozuka et al.

[11] Patent Number: 6,118,115
[45] Date of Patent: Sep. 12, 2000

[54] PHOTOELECTRIC CONVERSION APPARATUS

[75] Inventors: Hiraku Kozuka, Hiratsuka; Shigetoshi Sugawa, Atsugi; Yoshio Koide, Hiratsuka, all of Japan

[73] Assignee: Canon Kabushiki Kaisha, Tokyo, Japan

[21] Appl. No.: 09/114,920

[22] Filed: Jul. 14, 1998

[30] Foreign Application Priority Data

Jul. 18, 1997 [JP] Japan .................................. 9-193741

[51] Int. Cl.[7] .............................. H04N 3/14; H04N 5/335
[52] U.S. Cl. .................................. 250/208.1; 250/208.4; 348/241; 348/294
[58] Field of Search ........................... 250/208.1, 208.4; 248/241, 262, 294, 243

[56] References Cited

U.S. PATENT DOCUMENTS

| | | | |
|---|---|---|---|
| Re. 34,309 | 7/1993 | Tanaka et al. | 358/213.31 |
| 4,821,104 | 4/1989 | Kondo | 348/241 |
| 4,835,404 | 5/1989 | Sugawa et al. | 250/578 |
| 4,879,470 | 11/1989 | Sugawa et al. | 250/578 |
| 4,967,067 | 10/1990 | Hashimoto et al. | 250/208.1 |
| 4,972,243 | 11/1990 | Sugawa et al. | 357/30 |
| 5,339,106 | 8/1994 | Ueno et al. | 348/243 |
| 5,396,289 | 3/1995 | Nakamura | 348/294 |
| 5,434,619 | 7/1995 | Yonemoto | 348/241 |
| 5,771,070 | 6/1998 | Ohzu et al. | 348/241 |
| 5,998,779 | 12/1999 | Kozuka | 250/208.1 |

FOREIGN PATENT DOCUMENTS

| | | |
|---|---|---|
| 0232593 | 8/1987 | European Pat. Off. . |
| 1-154678 | 6/1989 | Japan . |
| 2302954 | 2/1997 | United Kingdom . |

OTHER PUBLICATIONS

Kazuo Miwada et al.; "A 100MHZ Data–Rate, 5000–Element CCD Linear Image Sensor With Reset Pulse Level Adjustment Circuit", 1992 IEEE International Solid State Circuits Conference, US, IEEE Inc. New York, vol. 35, pp. 168–169, 275 XP000315804 Issn: 0193–6530.

Patent Abstracts Of Japan; vol. 010, No. 046 (E–383), Feb. 22, 1986 & JP 60 200687 A (Hitachi Seisakusho KK), Oct. 11, 1985 * abstract *.

Shin Kikuchi and Yoshio Kolde, High Speed, High Gradation Contact Type Linear Image Sensor BASIS Multi–Chip Contact Sensor, The Institute of Television Engineers of Japan, vol. 47, No. 9, pp. 1177–1182 (1993).

Primary Examiner—Stephone B. Allen
Attorney, Agent, or Firm—Fitzpatrick, Cella, Harper & Scinto

[57] ABSTRACT

A photoelectric conversion apparatus is provided which can reduce FPNs as much as possible even if there is an unbalanced quantity between the capacitance values of a light signal capacitor CTS and a noise signal capacitor CTN, and can suppress FPNs as much as possible from being varied with irregular process precision degrees and operation conditions. The photoelectric conversion apparatus having a plurality of photoelectric conversion units, a noise signal holding unit for holding a noise signal read from each of the photoelectric conversion unit, a light signal holding unit for holding a light signal read from each of the photoelectric conversion unit a noise signal common output line, a light signal common output line, a reset unit for resetting the noise signal common output line and the light signal common output line, a reset voltage source connected to the reset unit, a read unit for reading the noise signal in the noise signal holding unit and the light signal in the light signal holding unit through a capacitance division by capacitances of the noise signal common output line and the light singal common output line, respectively, wherein the reset voltage source is provied with a variable voltage unit.

15 Claims, 11 Drawing Sheets

PHOTOELECTRIC CONVERSION APPARATUS

BACKGROUND OF THE INVENTION

1. Field of the Invention

The present invention relates to a one- or two-dimensional photoelectric conversion apparatus used for a video camera, a digital camera, a facsimile, an image scanner, a digital copier, an X-ray image pickup apparatus or the like which reads an image. More particularly, the invention relates to a photoelectric conversion apparatus capable of eliminating noises.

2. Related Background Art

In the field of photoelectric conversion apparatus, various types of apparatuses have been proposed including in addition to a CCD, a BASIS having a bipolar transistor at each pixel as an amplification element, a photoelectric conversion apparatus having a MOS transistor at each pixel as an amplification element (e.g., Japanese Patent Laid-Open Application No. 1-154678) and the like. In such amplification type photoelectric conversion apparatuses, performance variation of amplification elements at respective pixels produces fixed pattern noises (FPN). Various methods of eliminating FPNs have been proposed heretofore. Of these, one method proposes to correct a performance variation of amplification elements in accordance with a difference between a light signal (signal S) and a dark state signal (signal N). This method will be described with reference to FIGS. 1 and 2. FIG. 1 is a circuit diagram of one bit of a one-dimensional photoelectric conversion apparatus, and FIG. 2 is a timing chart (refer to The Institute of Television Engineers of Japan, Vol. 47, No. 9 (1993), p. 1180).

The circuit operation and FPN elimination will be described hereinunder. First, a control pulse $\phi_{CR}$ is turned on to reset storage capacitors CT 1 and 2. Next, after charges corresponding to incident light are applied to the base of a bipolar transistor 9 which is a sensor and the charges are stored, a control pulse $\phi_{TS}$ is turned on to transfer a light signal containing noises to a light signal capacitor CTS 1. Next, a control pulse $\phi_{BRS}$ is turned on to reset the sensor and then a control pulse $\phi_{TN}$ is turned on to transfer a sensor noise signal to a noise signal capacitor CTN 2. Thereafter, the control pulse $\phi_{BRS}$ is again turned on to reset the sensor and resume the storage operation.

During the storage operation, a shift register SR starts scanning. First, a light signal common output line 3 and a noise signal common output line 4 are reset by reset MOSs 5 and 6, and thereafter, data in the light signal capacitor CTS and noise signal capacitor CTN are output to the common output lines 3 and 4 through capacitance division by common output line capacitances 7 and 8. These common capacitances CHS 7 and CHN 8 are capacitances of the common output lines 3 and 4. The capacitance of the light signal common output line 3 is hereinafter defined as the output line capacitance CHS 7, and the capacitance of the noise signal common output line 4 is hereinafter defined as the output line capacitance CHN 8. Thereafter, the output line capacitances CHS 7 and CHN 8 are again reset to read CTS and CTN data of an unrepresented next bit.

The above operations are repeated to output data of all bits. Output signals are input via voltage followers 13 and 14 to a differential amplifier 15 to deliver a final output signal of an IC constituting the photoelectric conversion apparatus. FPNs in the chip are generated because of a variation of $h_{FE}$ and the like of bipolar transistors at respective pixels. The above-described S-N method can eliminate FPNs to be caused by a variation of $h_{FE}$ of bipolar transistors.

FPNs are fixed pattern noises in a dark state. FPNs are hereinafter defined as fixed pattern noises in a dark state.

A conventional FPN elimination method will be further detailed. In FIG. 1, a signal (Sout) on the light signal common output line and a signal (Nout) on the noise signal common output line are given by the following equations (1) and (2).

$$\text{Sout}=[(V_S \times C_{TS})+(V_{CHR} \times C_{HS})]/(C_{TS}+C_{HS}) \quad (1)$$

$$\text{Nout}=[(V_N \times C_{TN})+(V_{CHR} \times C_{HN})]/(C_{TN}+C_{HN}) \quad (2)$$

where VS is a voltage across the light signal capacitor CTS when a light signal is read, and VN is a voltage across the noise signal capacitor CTN when the noise signal is read.

If CHS=CHN=CH, VS=VN=VCT (in a dark state), and CTS=CTN=CT in the equations (1) and (2), then a difference (Sout−Nout) is 0.

Even if there is a variation of VCT at respective pixels, FPNs can be eliminated because the difference (Sout−Nout) is 0.

With the above-described S-N method, FPNs can be eliminated if the light signal capacitor CTS and the noise signal capacitor CTN have the same value.

However, in practice, there is an unbalanced quantity between the capacitance values of the light signal capacitor CTS and the noise signal capacitor CTN, the unbalanced quantity being caused by irregular process precision degrees. The inventors of the present invention have found that this unbalanced quantity causes FPNs.

If there is an unbalanced quantity ΔCT between the capacitance values of the light signal capacitor CTS and the noise signal capacitor CTN, i.e., if CTS=CT+ΔCT and CTN=CT, then the difference signal (Sout−Nout) is given by the following equation (3).

$$\text{Sout}-\text{Nout}=\{\Delta CT/(CT+CH)\} \times \{CH/(CT+CH)\} \times (VCT-VCHR) \quad (3)$$

Specifically, FPNs become proportional to the unbalanced quantity between the capacitance values of the light signal capacitor CTS when the light signal is read and the noise signal capacitor CTN when the noise signal is read.

Therefore, even if there is some unbalanced quantity, FPNs can be made minimum if a difference between a voltage VCT across the capacitor CT and a reset voltage VCHR of the output line capacitance CH is made small.

However, if the voltage VCT across the capacitor CT changes with irregular process precision degrees or operation conditions (e.g., supply voltages and operation frequency), a difference between the voltage VCT across the capacitor CT and the reset voltage VCHR of the output line capacitance CH also changes. Therefore, a variation of FPNs is caused by irregular process precision degrees and operation conditions, which variation is not preferable in practical use.

For example, in the conventional circuit shown in FIG. 1, the voltage VCT across the capacitor CT is mainly determined by $h_{FE}$ and base/collector capacitance Cbc of a pixel bipolar transistor, the capacitor CT, a read time of the capacitor CT, and the like. The reset voltage of the output line capacitance CH is fixed to a ground level. Therefore, if $h_{FE}$ and base/collector capacitance Cbc of a bipolar transistor change with irregular process precision degrees or the read time of the capacitor CT changes with a fluctuation of an operation frequency, then the voltage VCT across the capacitor CT changes so that FPNs depend upon irregular process precision degrees and a fluctuation of an operation frequency.

In the case of an amplification type photoelectric conversion apparatus having a photodiode and MOS amplifiers at each pixel, the voltage VCT across the capacitor CT is determined by threshold voltages Vth of MOS amplifiers and a reset voltage level of the photodiode. Therefore, if Vth of MOS amplifiers and the reset voltage level of the photodiode vary with irregular process precision degrees, a variation of FPNs also occurs.

The conventional FPN elimination method is therefore accompanied with a variation of FPNs to be caused by irregular process precision degrees and operation conditions, which variation is a great obstacle against the S/N improvement of a photoelectric conversion element.

SUMMARY OF THE INVENTION

It is an object of the present invention to provide a photoelectric conversion apparatus with high performance capable of reducing noises.

It is an another object of the present invention to provide a photoelectric conversion apparatus with high performance capable of reducing FPNs as much as possible even if there is an unbalanced quantity between the capacitor values of a light signal capacitor CTS and a noise signal capacitor CTN.

It is a still another object of the present invention to provide a photoelectric conversion apparatus with high performance capable of suppressing FPNs as much as possible from being varied with irregular process precision degrees and operation conditions.

In order to achieve the above objects, according to one aspect of the present invention there is provided a photoelectric conversion apparatus comprising: a plurality of photoelectric conversion means; noise signal holding means for holding a noise signal read from each of the photoelectric conversion means; light signal holding means for holding a light signal read from each of the photoelectric conversion means; a noise signal common output line; a light signal common output line; reset means for resetting the noise signal common output line and the light signal common output line; a reset voltage source connected to the reset means; and read means for reading the noise signal in the noise signal holding means and the light signal in the light signal holding means through a capacitance division by capacitances of the noise signal common output line and the light signal common output line, respectively, wherein the reset voltage source is provided with variable voltage means connected to the reset voltage source.

According to another aspect of the present invention there is provided a photoelectric conversion apparatus comprising: a plurality of photoelectric conversion means; noise signal holding means for holding a noise signal read from each of the photoelectric conversion means; light signal holding means for holding a light signal read from each of the photoelectric conversion means; a noise signal common output line; a light signal common output line; reset means for resetting the noise signal common output line and the light signal common output line; a reset voltage source connected to the reset means; and read means for reading the noise signal in the noise signal holding means and the light signal in the light signal holding means through a capacitance division by capacitances of the noise signal common output line and the light signal common output line, respectively, wherein an output value of a dummy pixel or an optical black pixel is used as a voltage value of the reset voltage source.

According to further aspect of the present invention there is provided a photoelectric conversion apparatus comprising: a plurality of photoelectric conversion means; noise signal holding means for holding a noise signal read from each of the photoelectric conversion means; light signal holding means for holding a light signal read from each of the photoelectric conversion means; a noise signal common output line; a light signal common output line; reset means for resetting the noise signal common output line and the light signal common output line; a reset voltage source connected to the reset means; and read means for reading the noise signal in the noise signal holding means and the light signal in the light signal holding means through a capacitance division by capacitances of the noise signal common output line and the light signal common output line, respectively, wherein an average voltage of the noise signal holding means is substantially equal to a voltage at the noise signal common output line and the light signal common output line reset by the reset means.

According to still further aspect of the present invention there is provided a photoelectric conversion apparatus comprising, on a same semiconductor substrate: a plurality of photoelectric conversion means; sensor reset means for resetting each of the photoelectric conversion means; a sensor reset voltage source connected to the sensor reset means; noise signal holding means for holding a noise signal read from each of the photoelectric conversion means; light signal holding means for holding a light signal read from each of the photoelectric conversion means; a noise signal common output line; a light signal common output line; reset means for resetting the noise signal common output line and the light signal common output line; a reset voltage source connected to the reset means; and read means for reading the noise signal in the noise signal holding means and the light signal in the light signal holding means through a capacitance division by capacitances of the noise signal common output line and the light signal common output line, respectively, wherein a variation factor of a voltage value of the noise signal holding means is made equal to variation factors of voltages at the noise signal common output line and the light signal common output line reset by the reset means.

According to another aspect of the present invention there is provided a photoelectric conversion apparatus comprising: a plurality of photoelectric conversion means; a plurality of noise signal holding means for holding noise signals read from the plurality of photoelectric conversion means; a plurality of light signal holding means for holding light signals read from the plurality of photoelectric conversion means; a noise signal common output line for outputting the noise signals read from the plurality of noise signal holding means; a light signal common output line for outputting the light signals read from the plurality of light signal holding means; reset means for resetting the noise signal common output line and the light signal common output line; and compensation voltage supply means for supplying to the reset means a compensation voltage, for eliminating noises to be caused by a performance variation between the noise signal holding means and the light signal holding means.

With the above embodiments, a high S/N ratio of the photoelectric conversion apparatus can be realized.

Other objects and advantages of the present invention will become apparent from the detailed description to follow taken in conjunction with the appended claims.

DETAILED DESCRIPTION OF THE PREFERRED EMBODIMENTS

Figure 3:
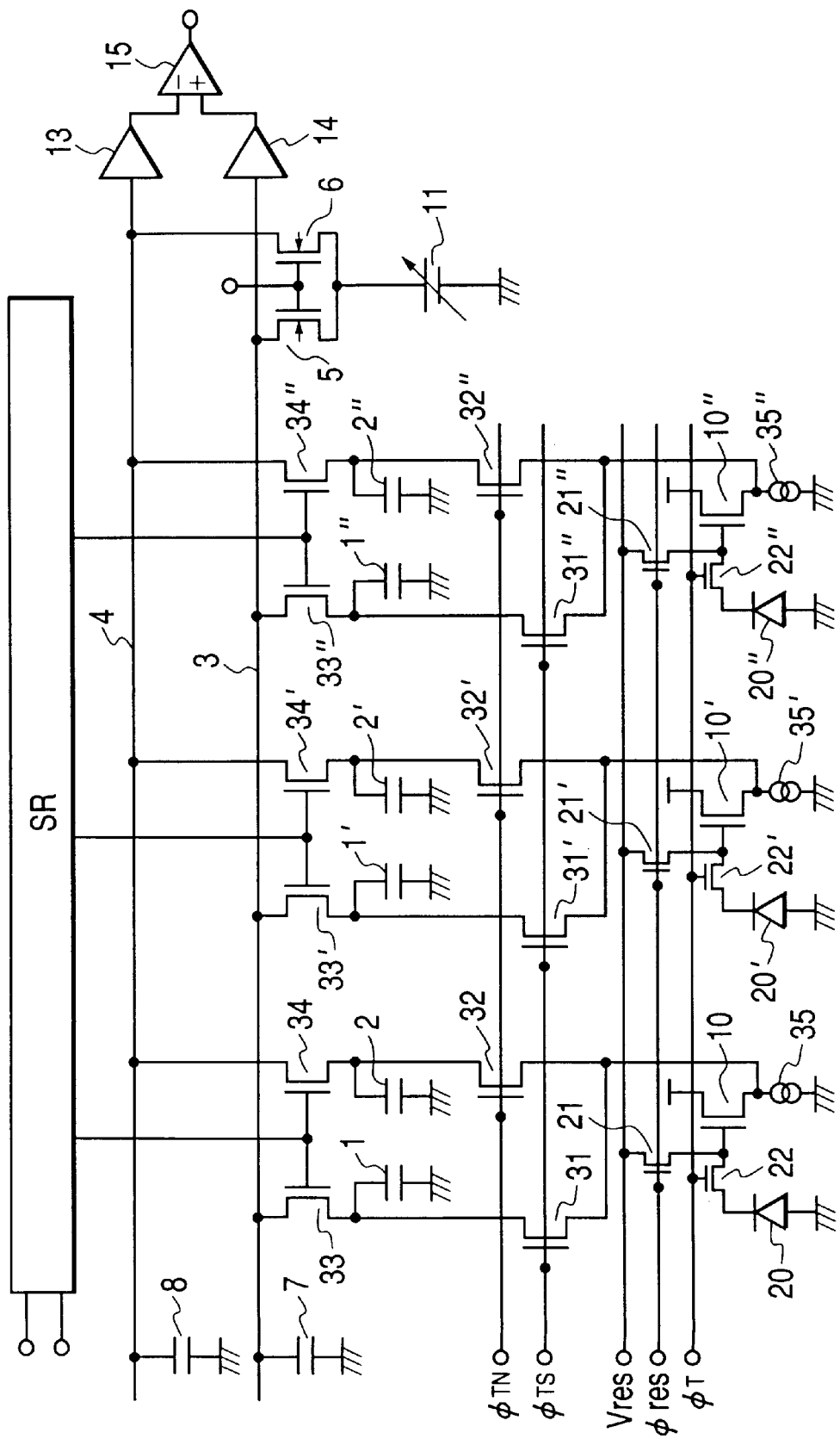
FIG. 3 is an equivalent circuit of a photoelectric conversion apparatus according to a first embodiment of the invention.

FIG. 3 is a circuit diagram of a photoelectric conversion apparatus according to the first embodiment of the invention. In this embodiment, each pixel is provided with a photodiode (20, 20', 20"), a reset switch (21, 21', 21"), a transfer switch (22, 22', 22"), an NMOS source follower (10, 10', 10"), a light signal capacitor CTS (1, 1', 1"), and a noise signal capacitor CTN (2, 2', 2"). A switching MOS (31, 31', 31", 32, 32', 32"), a transfer MOS (33, 33', 33", 34, 34', 34"), and a current source (35, 351, 35") are also provided.

In FIG. 3, the potentials of the light signal capacitor CTS (1, 1', 1") and noise signal capacitor CTN (2, 2', 2") take an output potential of the NMOS source follower (10, 10', 10") of each bit. Differences between the potentials of the light signal capacitors CTS (1, 1', 1") of the respective bits and between the potentials of the noise signal capacitors CTN (2, 2', 2") of the respective bits correspond to a variation of threshold voltages Vth of the NMOS source followers (10, 10', 10"). After the light signal common output line 3 and noise signal common output line 4 are reset by reset MOSs 5 and 6, data in the capacitors CTS and CTN are output to the common output lines 3 and 4 through capacitance division. Output line capacitances CHS 7 and CHN 8 are capacitances of the common output lines 3 and 4. The capacitance of the light signal common output line 3 is hereinafter defined as the output line capacitance CHS 7, and the capacitance of the noise signal common output line 4 is hereinafter defined as the output line capacitance CHN 8. Thereafter, the output line capacitances CHS 7 and CHN 8 are again reset to read CTS and CTN data of a next bit. Output signals on the common output lines are input via voltage followers 13 and 14 to a differential amplifier 15 to deliver an S–N output.

The characteristic feature of the present embodiment is that an output line capacitance CH reset voltage source 11 is provided with a variable voltage means. The effect of this variable voltage means will be described hereinunder.

Figure 4:
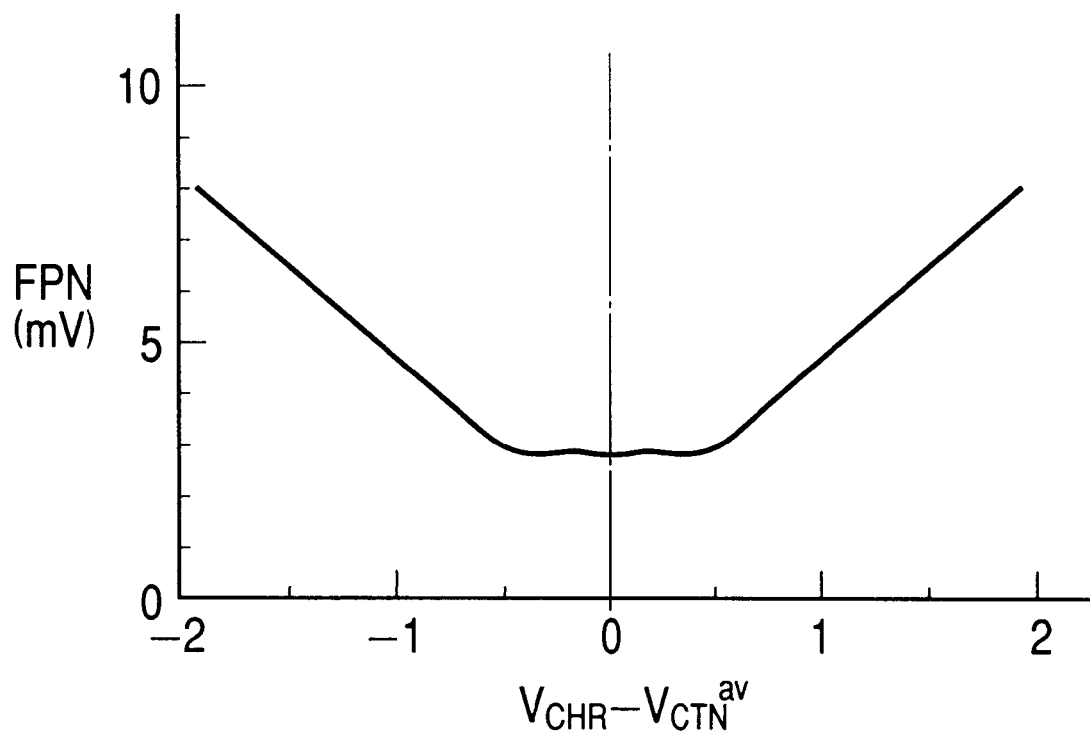
FIG. 4 is a graph showing FPN characteristics of the photoelectric conversion apparatus of the first embodiment.

FIG. 4 is a graph showing a relation between FPNs and a difference between the voltage of the output line capacitance CH reset voltage source 11 and an average voltage of the capacitors CT.

As given by the equation (3), as a difference between the voltage of the output line capacitance CH reset voltage source 11 and an average voltage of the capacitors CT becomes large, FPNs also become large.

It can be understood from the above fact that although the potentials of the light signal capacitor CTS (1, 1', 1") and noise signal capacitor CTN (2, 2', 2") are substantially equal, the unbalanced quantity between the capacitance values cannot be made zero so that FPNs are generated which are proportional to a difference between the voltage of the output line capacitance CH reset voltage source 11 and an average voltage of the capacitors CT.

With the structure of the embodiment, the FPN elimination effect of the photoelectric conversion apparatus can be maximized by adjusting the reset potential.

Figure 1:
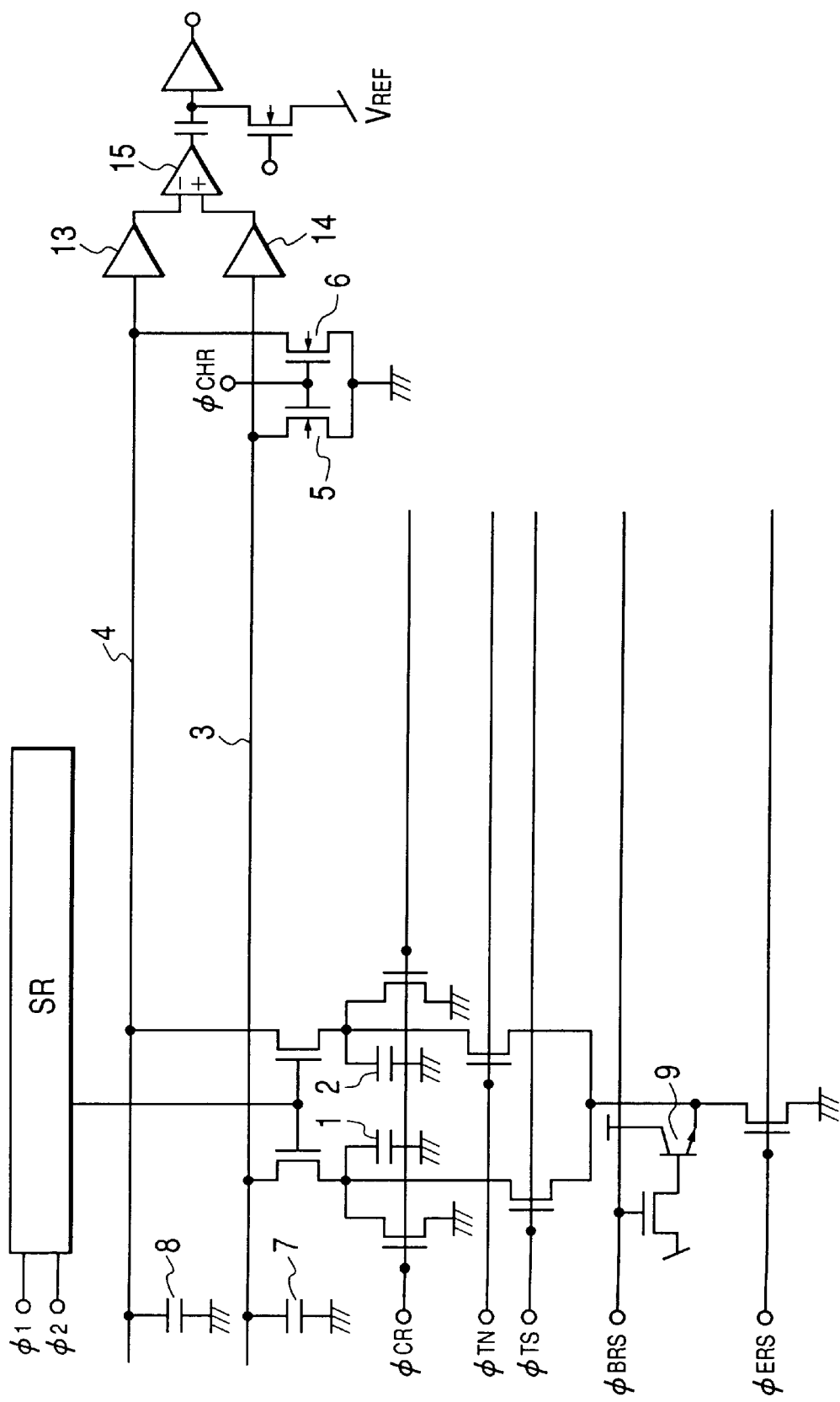
FIG. 1 is an equivalent circuit of a conventional photoelectric conversion apparatus.
Figure 2:
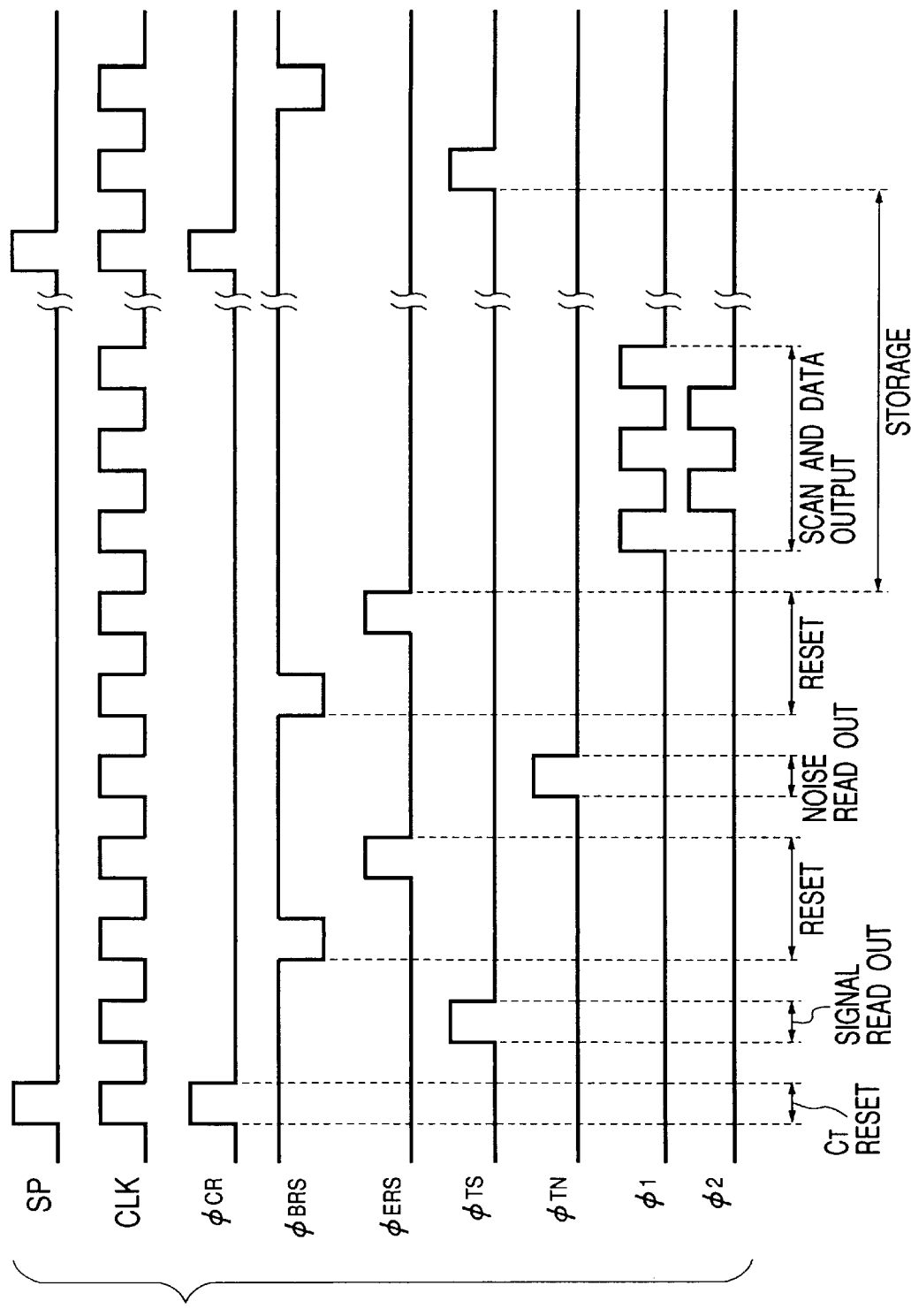
FIG. 2 is timing chart illustrating the operation of the conventional photoelectric conversion apparatus.

In this embodiment, although only three bits are shown in FIG. 2, the invention is not limited to only three bits but obviously any number of bits may be used.

Also in this embodiment, although a one-dimensional photoelectric conversion apparatus is used, a two-dimensional photoelectric conversion apparatus may also be used with similar effects, by sequentially reading charges at each line by using a vertical scan shift register.

Figure 5:
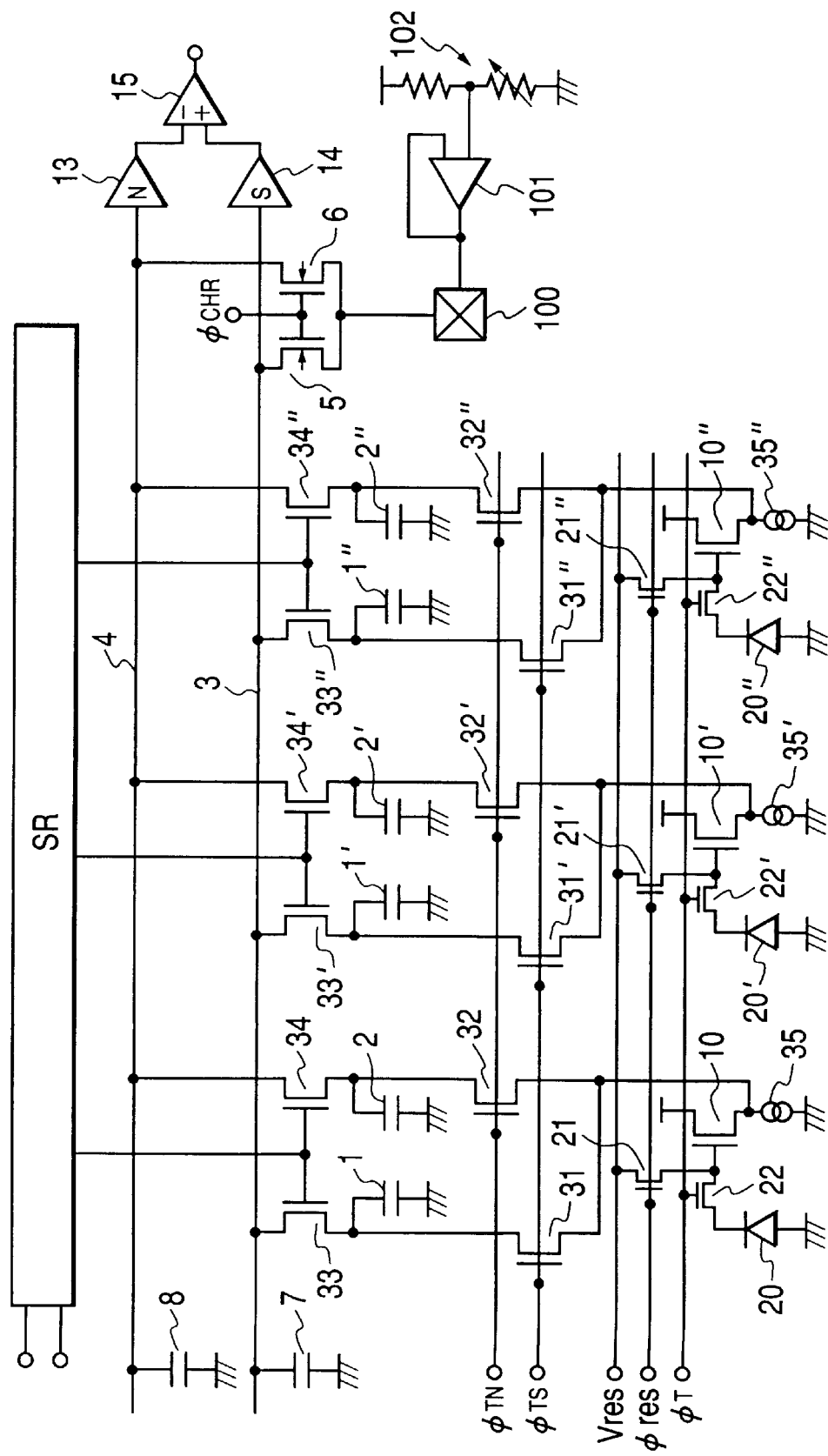
FIG. 5 is an equivalent circuit of a photoelectric conversion apparatus according to a second embodiment of the invention.

FIG. 5 is a circuit diagram of a photoelectric conversion apparatus according to the second embodiment of the invention. In this embodiment, the reset voltage source for the output line capacitances CHS 7 and CHN 8 is constituted of a variable resistor 102 and a voltage follower 101, and a reset voltage is supplied via a pad 100 to the internal circuit of an IC constituting the photoelectric conversion apparatus. The other structures are the same as the first embodiment. The voltage follower 101 is an impedance conversion element having a gain "1", and the variable resistor is externally operated to change its resistance value and hence its division voltage.

The characteristic feature of this embodiment is that a variable voltage means for the reset voltage source is provided outside of the IC constituting the photoelectric conversion apparatus. It is therefore possible to adjust the reset potential from the outside of the IC and minimize FPNs of the photoelectric conversion apparatus, even if the voltage of the capacitor CT changes with a process variation of Vth.

In this embodiment, the reset voltage source constituted of the variable resistor 102 and voltage follower 101 resets the output line capacitors CH via the pad 100. The voltage follower may be provided in the IC or it may not be used. Instead of the variable resistor 102, the voltage may be changed by electronically changing the gate potential to change the resistance between the source and drain of the MOS transistor.

Also in this embodiment, although only three bits are shown, the invention is not limited to only three bits but obviously any number of bits may be used. Also in this embodiment, although a one-dimensional photoelectric conversion apparatus is used, a two-dimensional photoelectric conversion apparatus may also be used with similar effects, by sequentially reading charges at each line by using a vertical scan shift register.

Figure 6:
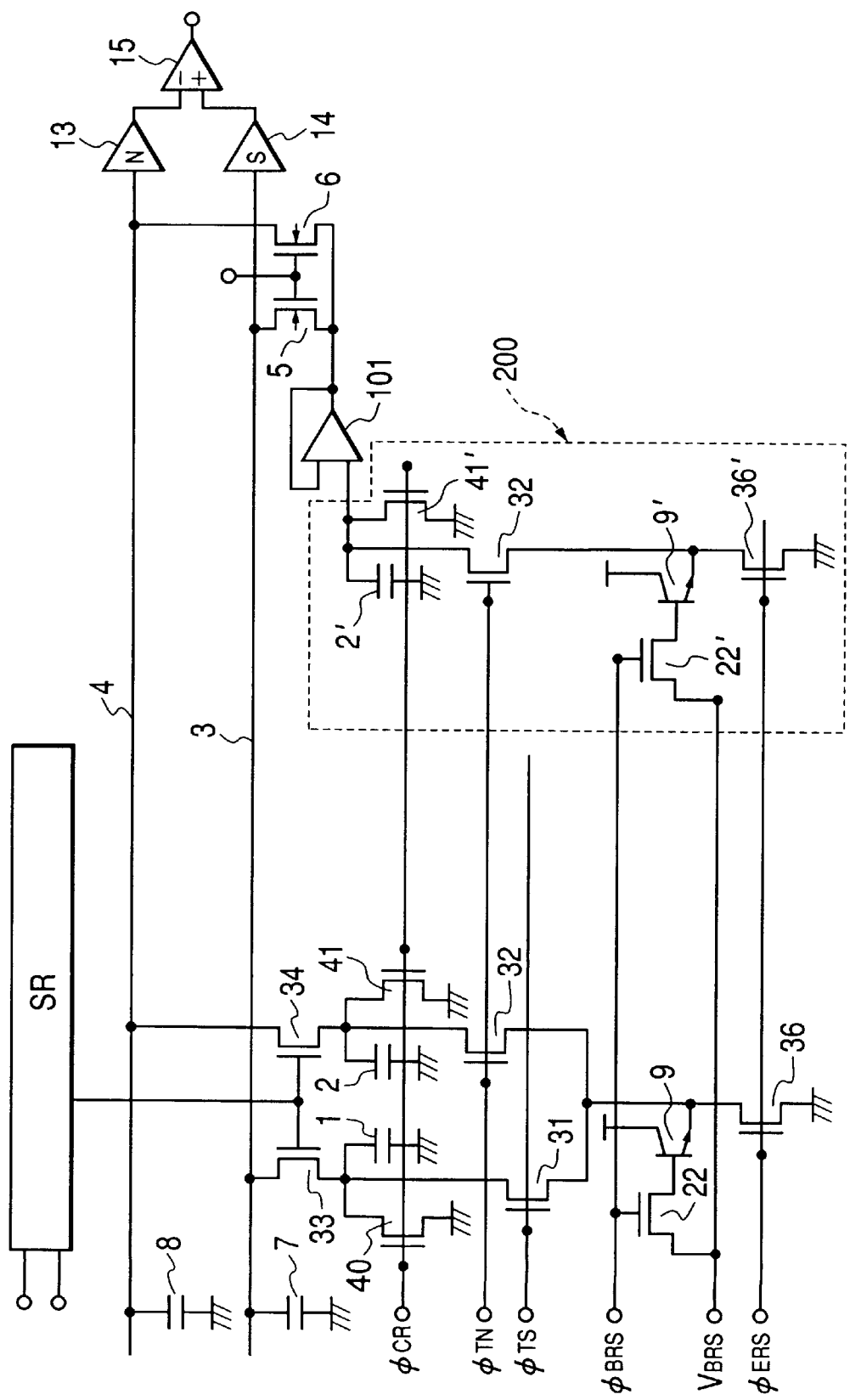
FIG. 6 is an equivalent circuit of a photoelectric conversion apparatus according to a third embodiment of the invention.

FIG. 6 is a circuit diagram of a photoelectric conversion apparatus according to the third embodiment of the invention. In this embodiment, the reset voltage source for the output line capacitances CHS 7 and CHN 8 is constituted of a dummy pixel 200 and a voltage follower 101. The other structures are basically the same as the first embodiment shown in FIG. 3. Although reset MOSs 40 and 41 for resetting the capacitors CT 1 and 2 and one photoelectric conversion element are shown in FIG. 6, it is obvious that the reset MOSs may be replaced by proper other elements and a plurality of photoelectric conversion elements may be used.

In this embodiment, similar to the circuit structure for deriving noise components, the dummy pixel 200 is constituted of a reset MOS 36', a bipolar transistor 9', a reset MOS 22', a switching MOS 32', a capacitor 2', and a reset MOS 41'. An output of the dummy pixel 200 is supplied via the voltage follower 101 to the reset MOSs 5 and 6 as their source voltage. It is therefore possible to make the potentials on the output lines 3 and 4 equal to the noise reading potential.

In this embodiment, the dummy pixel 200 may be either optically opened or closed. The bipolar transistor 9' and noise signal capacitor CTN 2' constituting the dummy pixel 200 are not necessarily required to have the same patterns as the effective pixel, but it is preferable that they have the same patterns.

It is preferable to make the noise signal capacitor CTN 2' have the same capacitance value as the noise signal capacitor CTN 2 of the effective pixel, for example, by considering the input capacitance of the voltage follower 101 and other parasitic capacitance.

As described earlier, the potential of the noise signal capacitor CTN 2 of the effective pixel depends upon $h_{FE}$ and base-collector capacitance of the pixel bipolar transistor 9, the capacitance of the noise signal capacitor CTN 2, and a read time of the noise signal capacitor CTN 2. With the structure of this embodiment, it is possible to make the reset potential of the output line capacitance CH generally equal to the potential of the capacitor CT to thereby suppress a variation of FPNs.

In this embodiment, although one bit dummy pixel is used for generating a reset voltage for the output line capacitance CH, a plurality of dummy pixels may be used for generating a reset voltage for the output line capacitance CH. Also in this embodiment, although a one-dimensional photoelectric conversion apparatus is used, a two-dimensional photoelectric conversion apparatus may also be used with similar effects, by sequentially reading charges at each line by using a vertical scan shift register.

Figure 7:
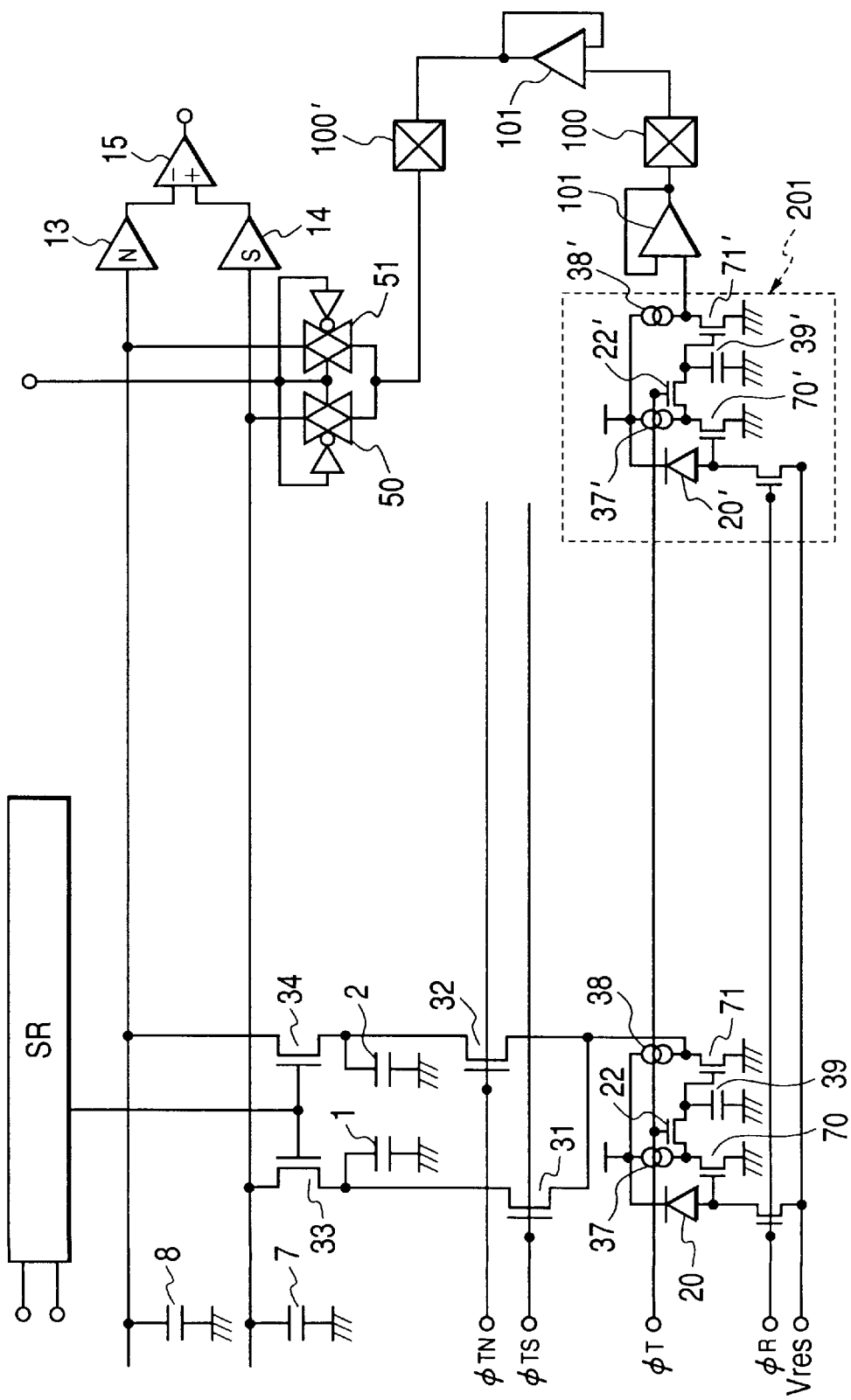
FIG. 7 is an equivalent circuit of a photoelectric conversion apparatus according to a fourth embodiment of the invention.

FIG. 7 is a circuit diagram of a photoelectric conversion apparatus according to the fourth embodiment of the invention. In this embodiment, the reset voltage source for the output line capacitances CHS 7 and CHN 8 is constituted of a dummy pixel 201 and voltage followers 101 and 101'. Although only one bit of the effective pixel is shown in FIG. 7, a plurality of effective pixels are actually used. In this embodiment, the effective pixel is constituted of a photodiode 20 and two-stage PMOS source followers 70 and 71. The potentials of the capacitors CT 1 and 2 are determined by the reset potential Vres of the photodiode 20 and Vth of the PMOS source followers 70 and 71, and hardly depend upon the capacitances of the capacitors CT 1 and 2. The capacitor CT of the dummy pixel 201 is therefore omitted. Analog switches 50 and 51 are used for resetting the output line capacitances CH so that a potential fluctuation when the capacitances CH are reset can be suppressed. Current sources 37 and 38 are turned on and off by a control pulse φT.

The characteristic feature of this embodiment is as follows. The voltage of the output line capacitance CH reset voltage source is determined by the dummy pixel 201, and supplied via a pad 100 to the voltage follower 101' provided outside of an IC constituting the photoelectric conversion apparatus for lowering the circuit impedance, and further via a pad 100' to the output line capacitance CH reset switches 50 and 51. With the structure of this embodiment, a desired circuit impedance for the output line capacitance CH reset voltage source can be realized, and the reset voltage can be set to the potential of the capacitor CT of the effective pixel. It is therefore possible to make a difference between the potential of the capacitor CT and the reset potential for the output line capacitance CH have a value near zero.

Similar to the third embodiment, the dummy pixel 201 of this embodiment may be either optically opened or shielded. The photodiode 20' and source followers 70' and 71' constituting the dummy pixel are not necessarily required to have the same patterns as the effective pixel, but it is preferable that they have the same patterns/parameters. The voltage follower 101 may be omitted. The dummy pixel 201 may be added with the dummy capacitor CT. In this embodiment, although one bit dummy pixel is used for generating a reset voltage for the output line capacitance CH, a plurality of dummy pixels may be used for generating a reset voltage for the output line capacitance CH.

Figure 8:
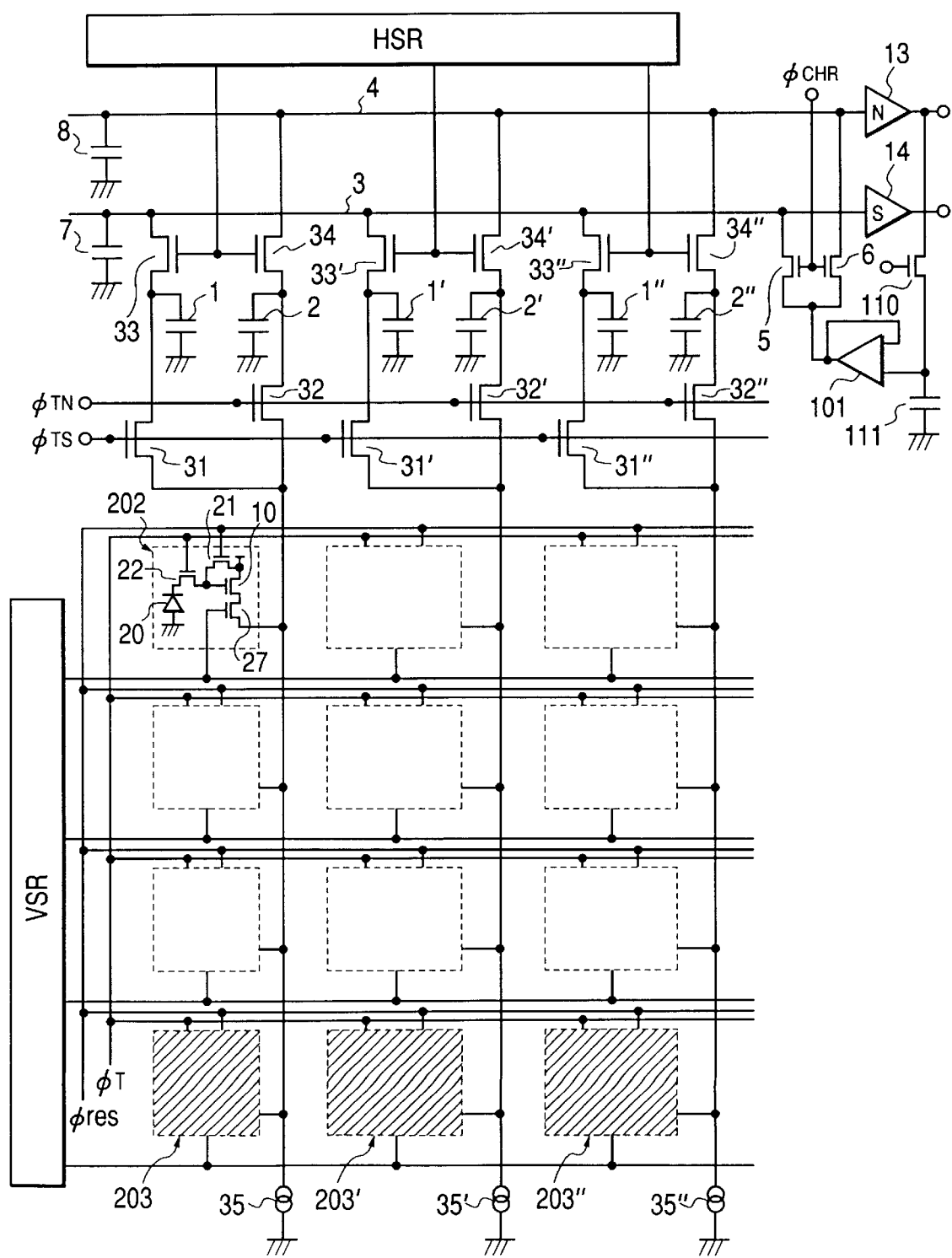
FIG. 8 is an equivalent circuit of a photoelectric conversion appparatus according to a fifth embodiment of the invention.

FIG. 8 is a circuit diagram of a photoelectric conversion apparatus according to the fifth embodiment of the invention. In this embodiment, a reset voltage for the output line capacitance CH is determined by using an output of optical blacks (OB) of a two-dimensional photoelectric conversion apparatus.

The structure of this embodiment is generally the same as the second embodiment shown in FIG. 5, except an addition of a vertical select switch 27 because of the two-dimensional photoelectric conversion apparatus. The OB pixels (203, 203', 203") have the same structure as the effective pixels except that they are optically shielded.

A characteristic feature of this embodiment is that an average voltage of a plurality of OB pixels determines the reset voltage for the output line capacitance CH. The output line capacitance CH reset voltage is determined by the following operations.

First, the OB pixels are selected, and a charge signal S representative of a light amount is detected with the photodiode 20 to read it in the capacitor CTS (1, 1', 1") and an N signal in the capacitor CTN (2, 2', 2"). In succession, the horizontal shift register is activated to sequentially turn on and off the transfer switch MOSs 33, 34 and the like to read the signals on the common output lines through capacitance division by the output line capacitances CH (7, 8). In this case, the output line capacitance CH reset switch (5, 6) is turned off so that the potential of the output line capacitance CH is an average output voltage of the OB pixels.

Next, the switch 110 is turned on and off to hold in a capacitor 111 an output voltage of an amplifier 13 of the output line 4 to which the average output voltage of the OB pixels was applied, and to determine the reset voltage for the output line capacitance CH via a voltage follower 101. Thereafter, the effective pixels are read by an ordinary operation.

In this embodiment, an average voltage of a plurality of OB pixels is used for determining the output line capacitance CH reset voltage. It is therefore possible to produce the output line capacitance CH reset voltage near the average voltage, even if there is a variation of Vth of source followers at respective pixels. Instead of sequentially reading the OB pixels, the OB pixels may be read at the same time to the common output line to obtain the average voltage of the OB pixels. In the example shown in FIG. 8, although the noise signal N is used, the signal S may be used or both the signals S and N may be used. The characteristic feature of the embodiment is to use the average voltage of the OB pixels as the output line capacitance CH reset voltage. The other means and operations may be used to determine the reset voltage, with similar advantages being expected.

In this embodiment, 3×3 effective pixels and 1×3 OB pixels are used. The numbers of effective pixels and OB pixels are not limited to the above.

Figure 9:
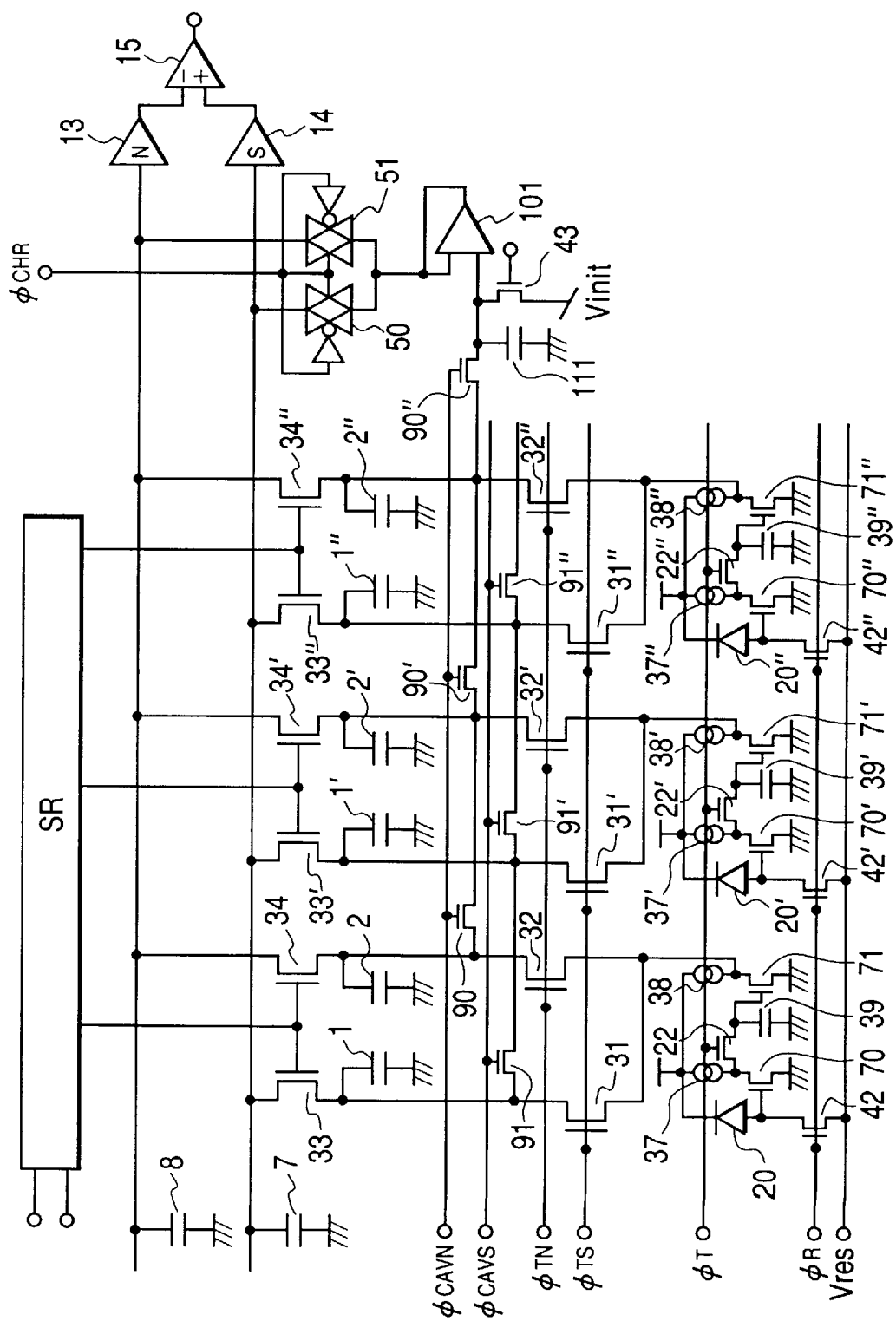
FIG. 9 is an equivalent circuit of a photoelectric conversion apparatus according to a sixth embodiment of the invention.

FIG. 9 is a circuit diagram of a photoelectric conversion apparatus according to the sixth embodiment of the invention. In this embodiment, a reset voltage for the output line capacitance CH is determined by using an average of noise outputs N of effective pixels.

The structure of this embodiment is generally the same as the fourth embodiment shown in FIG. 7, excepting that switches (90, 90', 90") for interconnecting adjacent light signal capacitors CTS (1, 1', 1") and switches (91, 91', 91") for interconnecting adjacent noise signal capacitors CTN (2, 2', 2"), are provided.

The operation of this embodiment will be described. First, the noise signals are read into the capacitors CTN (2, 2', 2") and thereafter the switches (90, 90', 90") are turned on. A capacitor 111 therefore takes an approximately average potential of the noise signals N of the effective pixels. Thereafter, the switches (90, 90' 90") are turned off and the noise signals N are again read into the noise signal capacitors CTN (2, 2', 2"). Reading the noise signals at the first time is an operation of determining a reset voltage for the output line capacitance CH, and reading the noise signals at the second time is an operation of reading actual noise signals N.

In this embodiment, a reset MOS 43 is provided for resetting the capacitor 111 to an initial potential Vint. This initial potential is preferably set to the potential of the noise signal N. This reset MOS 43 for resetting the capacitor 111 may be omitted if a division ratio by the capacitor 111 relative to a total capacitance of the capacitors CTN (2, 2', 2") of all bits is sufficiently large. The switches (91, 91', 91") interconnecting the capacitors CTS are provided in order to balance the structures of the capacitors CTS and CTN and are maintained always turned off.

The most characteristic feature of the embodiment is that the reset voltage for the output line capacitance CH is determined by using an average output of the signals N of the effective pixels. This embodiment is suitable for use with a photoelectric conversion apparatus which cannot use dummy or OB pixels such as a photoelectric conversion apparatus for a multi-chip type tight contact image sensor or which is unnecessary to use dummy or OB pixels. The FPN reducing effect can be obtained obviously for an ordinary photoelectric conversion apparatus.

Figure 10:
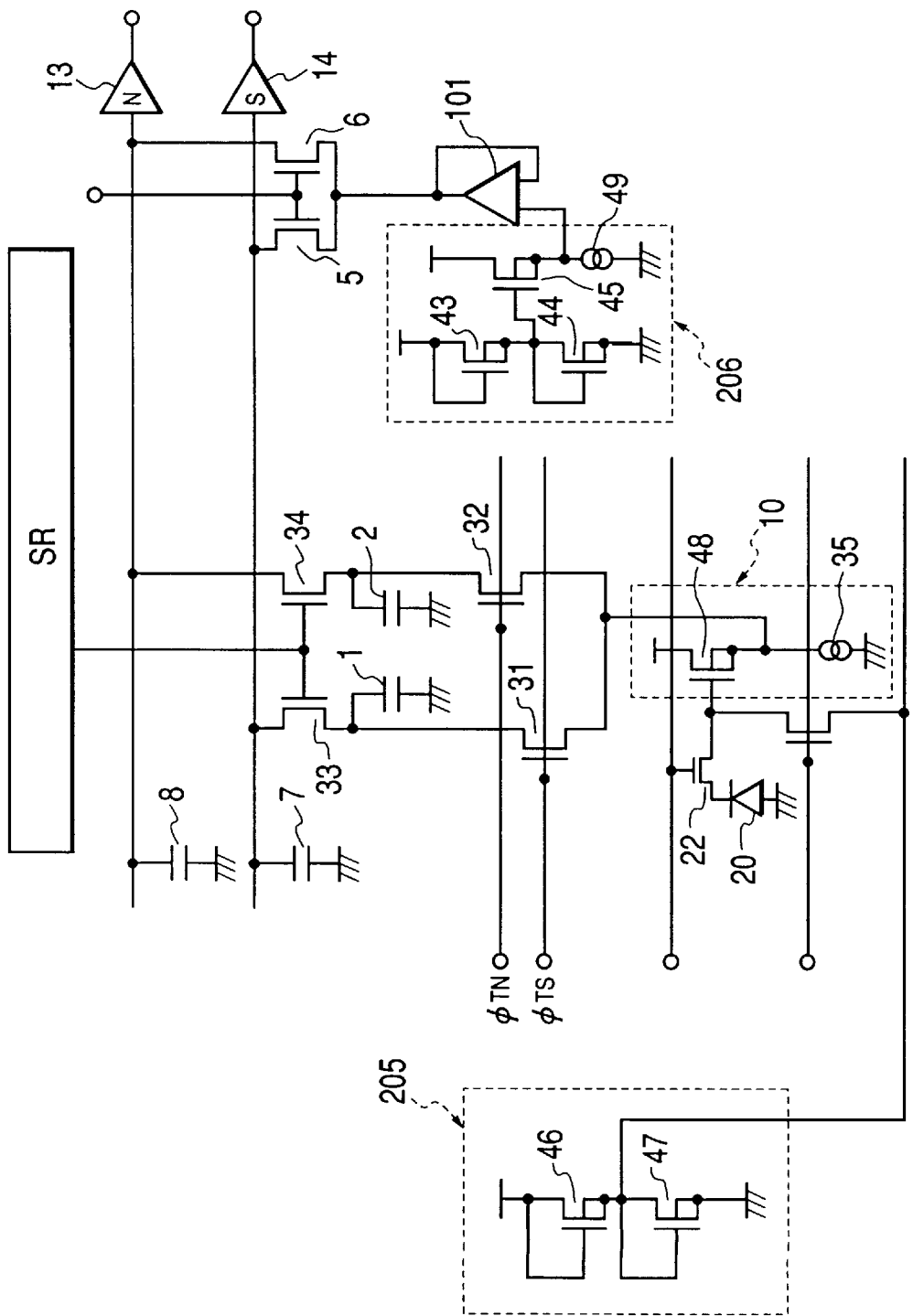
FIG. 10 is an equivalent circuit of a photoelectric conversion apparatus according to a seventh embodiment of the invention.

FIG. 10 is a circuit diagram of a photoelectric conversion apparatus according to the seventh embodiment of the invention. In this embodiment, an output line capacitance CH reset voltage source is configured so that the voltage across the capacitor CT and the reset voltage for the output line capacitances CH change with a process variation in the same direction. In FIG. 10, the potential of the noise signal capacitance CTN 2 is mainly determined by a voltage of a reset power source 205 of the photodiode 20 and Vth of an NMOS source follower 10. The reset voltage source 205 is constituted of two-stage NMOS diodes 43 and 44, an NMOS source follower 45, a current source 49, and a voltage follower 101. With this configuration, for example, even if Vth of NMOS changes with a process variation, a difference between the potential of the capacitor CT 1, 2 and the reset potential for the output line capacitance CH can be made constant near at a zero value, so that FPNs to be caused by a process variation can be suppressed.

With this embodiment, the effect that FPNs to be caused by a process variation can be suppressed can be retained sufficiently, even if parameters of the reset power source 105 and NMOS source follower 45 are not made perfectly the same, the parameters including an NMOS gate length, gate width, current value and the like.

The characteristic feature of the embodiment is that the reset power source for the output line capacitance CH is configured by using devices of the same type as those used for determining the potential across the capacitor CT to thereby suppress FPNs to be caused by a process variation. In this embodiment, although NMOS transistors are mainly used, the embodiment is not limited only to NMOS transistors, but other semiconductor devices such as PMOS transistors and resistors may also be used, with the effect that FPNs to be caused by a process variation can be suppressed. Similar to the sixth embodiment, this embodiment is also suitable for use with a photoelectric conversion apparatus which cannot use dummy or OB pixels such as a photoelectric conversion apparatus for a multi-chip type tight contact image sensor.

Figure 11:
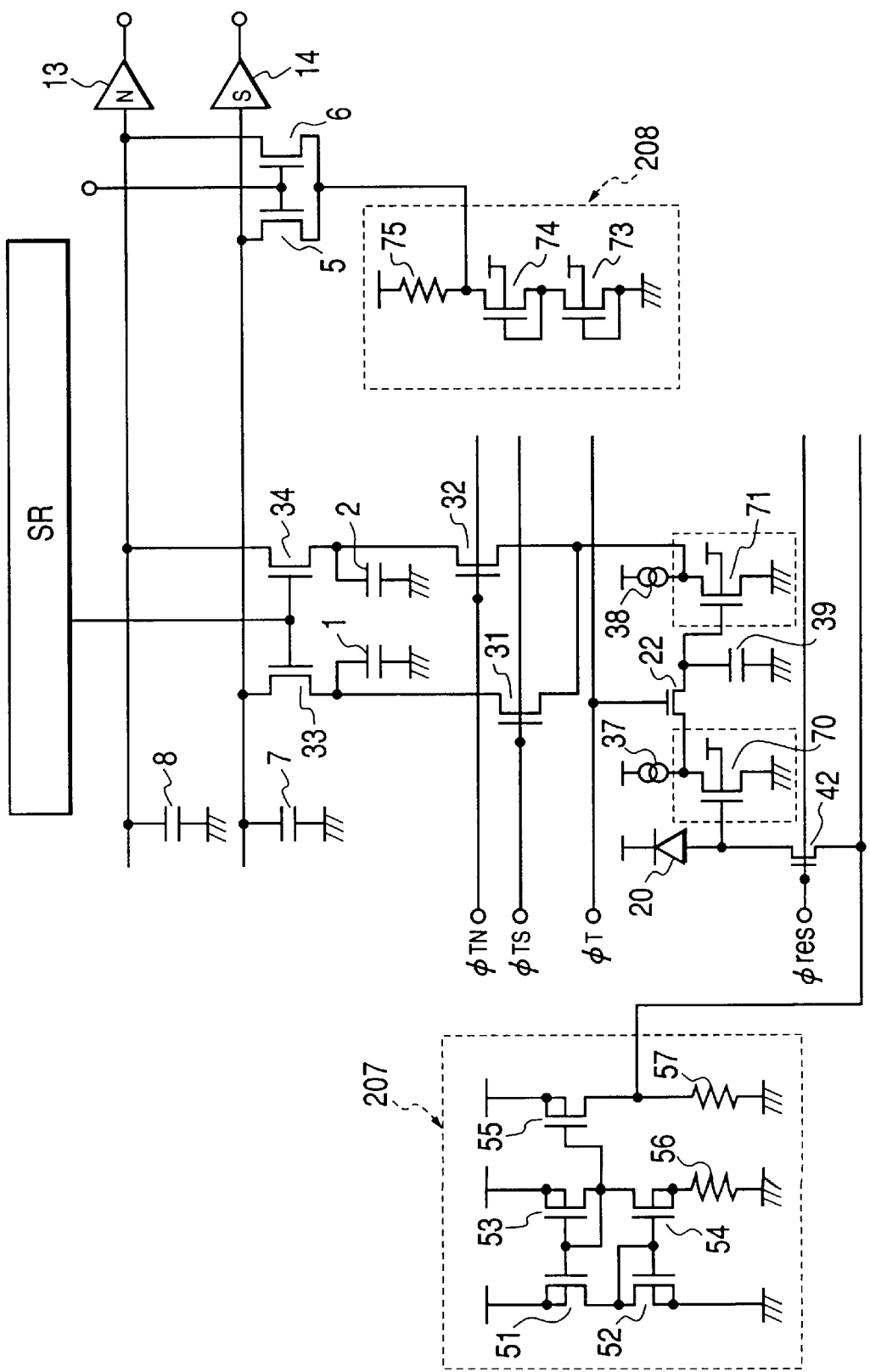
FIG. 11 is an equivalent circuit of a photoelectric conversion apparatus according to an eighth embodiment of the invention.

FIG. 11 is a circuit diagram of a photoelectric conversion apparatus according to the eighth embodiment of the invention. Similar to the seventh embodiment, also in this embodiment, an output line capacitance CH reset voltage source is configured so that the voltage across the capacitor CT and the reset voltage for the output line capacitance CH change with a process variation in the same direction.

In FIG. 11, the potential of the noise signal capacitance CTN 2 is mainly determined by a voltage of a reset power source 207 of the photodiode 20 and Vth of a PMOS source follower (70, 71). The reset voltage source 207 is constituted of constant current sources 51 to 55 and resistors 56 and 57. Therefore, the potential of the noise signal capacitance CTN 2 changes with a threshold value Vth of PMOS and a resistance variation of the resistors. In this embodiment, an output line capacitance CH reset voltage source 208 is constituted of two-stage PMOS diodes 73 and 74 and a resistor. In order to lower the impedance of the output line capacitance CH reset voltage source 208, the sizes of the PMOS diodes 73 and 74 of the output line capacitance CH reset voltage source 208 are made different from the sizes of the PMOS source followers 70 and 71 at respective pixels.

In this embodiment, under the conditions that a variation of threshold value Vth of PMOS is ±0.3 V, a resistor variation is ±30%, and a power supply variation is ±10%, a difference between the potential of the capacitor CT and the reset potential for the output line capacitance CH was in a range of 0.3 V or smaller and FPNs to be caused by a process variation posed no practical problem. Similar to the sixth embodiment, this embodiment is also suitable for use with a photoelectric conversion apparatus which cannot use dummy or OB pixels such as a photoelectric conversion apparatus for a multi-chip type tight contact image sensor.

In each of the first to eighth embodiments, although photoelectric conversion elements of one or three bits are used, a plurality of pixel bits may be used for one-dimensional photoelectric conversion apparatus or a two-dimensional photoelectric conversion apparatus may also be used with similar effects, by sequentially reading charges at each line by using a vertical scan shift register.

In the first to eighth embodiments, MOS transistors and bipolar transistors are used in the photoelectric conversion apparatus. The embodiments are not limited to these components, but other components such as SIT may also be used.

As described so far, with the above embodiments, FPNs of a photoelectric conversion apparatus to be caused by a process variation can be suppressed and a high S/N ratio of the apparatus can be realized, which cannot be achieved by conventional techniques.

Since FPNs are suppressed at the last stage of time-sequentially reading pixel bits, variations not only of the photoelectric conversion apparatus itself but also of switching MOS transistors can be suppressed and FPNs can be reduced sufficiently.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus comprising:
a plurality of photoelectric conversion means;
noise signal holding means for holding a noise signal read from each of said photoelectric conversion means;
light signal holding means for holding a light signal read from each of said photoelectric conversion means;
a noise signal common output line;
a light signal common output line;
reset means for resetting said noise signal common output line and said light signal common output line;
a reset voltage source connected to said reset means; and
read means for reading the noise signal in said noise signal holding means and the light signal in said light signal holding means through a capacitance division by capacitances of said noise signal common output line and said light signal common output line, respectively,
wherein said reset voltage source is provided with variable voltage means.

2. A photoelectric conversion apparatus according to claim 1, wherein said variable voltage connected to said reset voltage source is connected to said reset means by a reset switch via a bonding pad.

3. A photoelectric conversion apparatus comprising:
a plurality of photoelectric conversion means;
noise signal holding means for holding a noise signal read from each of said photoelectric conversion means;
light signal holding means for holding, a light signal read from each of said photoelectric conversion means;
a noise signal common output line;
a light signal common output line;
reset means for resetting said noise signal common output line and said light signal common output line;
a reset voltage source connected to said reset means; and
read means for reading the noise signal in said noise signal holding means and the light signal in said light signal holding means through a capacitance division by capacitances of said noise signal common output line and said light signal common output line, respectively,
wherein an output value of a dummy pixel or an optical black pixel is used as a voltage value of said reset voltage source.

4. A photoelectric conversion apparatus according to claim 3, wherein said reset voltage source includes a voltage follower.

5. A photoelectric conversion apparatus according to claim 3, wherein the output value of the dummy pixel or an optical black pixel is an average output value of a plurality of dummy pixels or a plurality of optical black pixels.

6. A photoelectric conversion apparatus comprising:
a plurality of photoelectric conversion means;
noise signal holding means for holding a noise signal read from each of said photoelectric conversion means;
light signal holding means for holding a light signal read from each of said photoelectric conversion means;
a noise signal common output line;
a light signal common output line;
reset means for resetting said noise signal common output line and said light signal common output line;
a reset voltage source connected to said reset means; and
read means for reading the noise signal in said noise signal holding means and the light signal in said light signal holding means through a capacitance division by capacitances of said noise signal common output line and said light signal common output line, respectively,
wherein an average voltage of said noise signal holding means is substantially equal to a voltage at said noise signal common output line and said light signal common output line reset by said reset means.

7. A photoelectric conversion apparatus according to claim 6, wherein a difference between the average voltage of said noise signal holding means and the voltage at said noise signal common output line and said light signal common output line reset with said reset means, is 0.5 V or smaller.

8. A photoelectric conversion apparatus comprising, on a same semiconductor substrate:
a plurality of photoelectric conversion means;
sensor reset means for resetting each of said photoelectric conversion means;
a sensor reset voltage source connected to said sensor reset means;
noise signal holding means for holding a noise signal read from each of said photoelectric conversion means;
light signal holding means for holding a light signal read from each of said photoelectric conversion means;
a noise signal common output line;
a light signal common output line;
reset means for resetting said noise signal common output line and said light signal common output line;
a reset voltage source connected to said reset means; and
read means for reading the noise signal in said noise signal holding means and the light signal in said light signal holding means through a capacitance division by capacitances of said noise signal common output line and said light signal common output line, respectively,
wherein a variation factor of a voltage value of said noise signal holding means is made equal to variation factors of voltages at said noise signal common output line and light signal common output line reset by said reset means.

9. A photoelectric conversion apparatus according to claim 8, wherein the variation factor includes a Vth of a MOS transistor, a resistor value, an $h_{FE}$ of a bipolar transistor, a base-collector capacitance of the bipolar transistor, respectively being changed with a process variation.

10. A photoelectric conversion apparatus comprising:

a plurality of photoelectric conversion means;

light signal holding means for holding a light signal read from each of said photoelectric conversion means;

a light signal common output line for transferring the light signal;

noise signal holding means for holding a noise signal read from each of said photoelectric conversion means;

a noise signal common output line for transferring the noise signal;

reset means for resetting said noise signal common output line and said light signal common output line; and a reset voltage source connected to said reset means, wherein said reset voltage source is provided with variable voltage means.

11. A photoelectric conversion apparatus according to claim 10, wherein said variable voltage provided at said reset voltage source is connected to a reset switch via a bonding pad.

12. A photoelectric conversion apparatus comprising:

a plurality of photoelectric conversion means;

a plurality of noise signal holding means for holding noise signals read from the plurality of said photoelectric conversion means;

a plurality of light signal holding means for holding light signals read from the plurality of said photoelectric conversion means;

a noise signal common output line for outputting the noise signals read from the plurality of said noise signal holding means;

a light signal common output line for outputting the light signals read from the plurality of said light signal holding means;

reset means for resetting said noise signal common output line and said light signal common output line; and compensation voltage supply means for supplying to said reset means a compensation voltage, for eliminating noises to be caused by a performance variation between said noise signal holding means and said light signal holding means.

13. A photoelectric conversion apparatus according to claim 12, wherein said compensation voltage supply means can supply an optional voltage to said reset means.

14. A photoelectric conversion apparatus according to claim 12, wherein said compensation voltage supply means is noise compensation photoelectric conversion means having a same structure as said photoelectric conversion means.

15. A photoelectric conversion apparatus comprising:

a plurality of photoelectric conversion means;

a plurality of noise signal holding means for holding noise signals read from the plurality of said photoelectric conversion means;

a plurality of light signal holding means for holding light signals read from the plurality of said photoelectric conversion means;

a noise signal common output line for outputting the noise signals read from the plurality of said noise signal holding means;

a light signal common output line for outputting the light signals read from the plurality of said light signal holding means;

reset means for resetting said noise signal common output line and said light signal common output line; and variable voltage supply means for supplying said reset means with variable voltage.

* * * * *